3,202,628
CHLORINATED POLYETHYLENE-ACRYLATE COATING FOR CHLOROSULFONATED POLYETHYLENE
Richard H. Burd, Wilmington, Del., assignor to E. I. du Pont de Nemours and Company, Wilmington, Del., a corporation of Delaware
No Drawing. Filed Jan. 9, 1962, Ser. No. 165,252
12 Claims. (Cl. 260—32.8)

This invention relates to a new composition of matter which can be applied as a coating on chlorosulfonated polyethylene. This invention further relates to a process for enhancing the soil resistance of this polymer.

As a result of its excellent weather resistance, chlorosulfonated polyethylene is being used in applications such as a base for exterior paints, as a coating for fabrics to produce tarpaulins and automotive convertible topping, and as insulation for outdoor electrical wire. Unfortunately, chlorosulfonated polyethylene has only limited resistance to soiling. Soiling reduces the acceptability of chlorosulfonated polyethylene in applications where appearance is very critical. This problem has been particularly troublesome in the manufacture of automotive convertible tops where considerable handling is involved during fabrication and installation.

The soiling resistance of materials can often be improved by applying a coating such as a top coating; however, an acceptable top coating must be easy to apply, adhere well to the substrate and, in the case of chlorosulfonated polyethylene, resist discoloration from exposure to sunlight. Also a top coating must not interfere with any of the operations normally involved in using the substrate. For example, automotive convertible tops made of chlorosulfonated polyethylene coated fabric are generally fabricated by dielectric sealing. It is obvious that a top coat which would interfere with the dielectric sealing step would not be satisfactory for this use.

It is an object of this invention to provide a new composition of matter which can be used as a coating on a chlorosulfonated polyethylene containing substrate. It is a further object to provide a stable coating which is easily applicable to said substrate and which does not interfere with subsequent manufacturing operations thereon, such as sealing. A still further object of this invention is to provide a process for increasing the soil resistance of a chlorosulfonated polyethylene containing substrate. Other objects will appear hereinafter.

These and other objects are accomplished by coating completely or partially as desired, for example a top coating only, a chlorosulfonated polyethylene containing substrate with the following composition comprising in a weight relationship: (a) about 175 to 225 parts of a 40 percent solution in toluene of an acrylic resin produced by copolymerizing a 4:1 mixture of methyl methacrylate and ethyl acrylate, (b) about 30 to 50 parts of chlorinated polyethylene containing 48 to 55 percent chlorine, (c) about 45 to 75 parts of xylene, (d) a minor proportion of stabilizing ingredients, and if desired, (e) additional toluene to adjust the solids content of the above composition to suit the coating procedure employed. By the term "chlorosulfonated polyethylene containing substrate" is meant an underlayer or base composed either entirely or partly of chlorosulfonated polyethylene.

The novel composition of this invention can be applied as a top coating to chlorosulfonated polyethylene containing about 25 to 37% chlorine and 0.4 to 3% sulfur both by weight. The chlorosulfonated polyethylene may be made from high density linear polyethylene produced by low pressure polymerization of ethylene or it may be made from low density, highly branched polyethylene produced by the high pressure free radical polymerization of ethylene. The molecular weight of the polyethylene used for producing the chlorosulfonated polyethylene should correspond to a melt index, as determined by ASTM D–1328–52T, of at least 0.2 to about 100. The chlorosulfonated polyethylene may be made by the method given in U.S. 2,586,363.

The chlorosulfonated polyethylene may be compounded with reinforcing agents, fillers and pigments such as carbon black, clay, calcium carbonate, barium sulfate, titanium dioxide, and chrome yellow. Curing agents may also be employed, but their use is optional. Curing systems for chlorosulfonated polyethylene are usually based on oxides or weak acid salts of certain polyvalent metals such as lead and magnesium. High molecular weight organic acids such as rosin and vulcanization accelerators such as those described in "Hypalon 20," "Principles of Compounding and Processing" by B. W. Fuller, published by the Elastomer Chemicals Department, E. I. du Pont de Nemours & Co., 1956, are generally used in combination with the polyvalent metal compounds.

In the following description, the compositions are given in terms of weight quantities.

The base of the novel coating of this invention contains two major components. The first of these is an acrylic resin which is produced by copolymerization of about 80 parts of methyl methacrylate and 20 parts of ethyl acrylate. The copolymer can be prepared by solution copolymerization in toluene with a free radical polymerization catalyst. The copolymer is employed in the form of a 40% solution in toluene, which solution has a viscosity of about 600–1100 c.p.s. at 30° C. The second major component is chlorinated polyethylene which is produced by free radical chlorination of low density, highly branched polyethylene with a molecular weight corresponding to a melt index of about 100. The chlorine content should range from about 48 to 55%.

In preparing the coating of the present invention, for whole or partial coverage, about 30 to 50 parts of chlorinated polyethylene is used with about 175 to 225 parts of the 40% solution of acrylic resin in toluene. This amount of the toluene solution corresponds to about 70 to 90 parts of the acrylic resin on a dry basis. The stated proportions of the acrylic resin and the chlorinated polyethylene are required to combine flexibility, good adhesion, soiling resistance, and heat sealable characteristics in the top coating composition. If less chlorinated polyethylene is used, the top coating is deficient in adhesive and heat sealing characteristics. If the quantity of acrylic resin is reduced below the specified level, resistance to soiling is impaired.

In addition to the toluene contained in the acrylic resin solution, about 45 to 75 parts of xylene are employed in these coating compositions to increase the solubility of the chlorinated polyethylene portion. While xylene is preferred, other solvents in which this polymer is soluble may be used, such as toluene and methyl ethyl ketone. The solution produced by combining the acrylic resin toluene solution, chlorinated polyethylene and xylene may be further diluted with toluene so as to produce any desired solids content below about 35%. The composition containing about 25–35% solids is useful if the coating is to be applied by a spreading technique. Dilute solutions containing about 15% solids, are useful if the solution is to be sprayed. A solution of lower solids content can be employed for other coating methods, as, for example, a solution containing about 10% solids for dip coating.

Stabilizing agents are added to the coating composition of the present invention to prevent color formation on exposure to heat and/or light. About 1 to 1.5 parts of a stabilizer composition comprising barium and cadmium salts of an organic fatty acid and an alkylated phenol along with an organic phosphite, are added. This type of stabilizer composition is described in British Patent 752,053. In addition to this stabilizer composition, 0.1 to 0.3 part of a hydroxybenzophenone type ultraviolet screening agent is added to minimize discoloration on exposure to sunlight. The preferred ultraviolet screening agent is 2-hydroxy-4-n-octoxy-benzophenone, but other similar ultraviolet screening agents may be used.

The coating composition of the present invention can be prepared on a small scale by placing all of the required ingredients in a jar and rolling at room temperature until solution of all ingredients is effected. On a larger scale, the composition can be prepared by placing all of the ingredients required in a paddle mill of the type used by the paint industry or in a churn and by agitating until solution of all ingredients is completed. The additional toluene, if required, for adjusting the solids content of the finished composition can be added initially before solution is effected, or at any later stage in the process. While it is generally most convenient to add all of the ingredients before starting to prepare the solution, it is not required that this be done and the ingredients can be added in any order desired. For example, the chlorinated polyethylene can be added to the xylene in the formulation and the mixture agitated until solution has taken place. The acrylic resin solution can then be added along with the minor components of the formulation and the entire mixture agitated until it is homogeneous The coating composition can be applied to chlorosulfonated polyethylene by conventional means. To top coat, a knife-over roll spreader, a bird spreader bar or other similar equipment may be used to apply the coating to a film of chlorosulfonated polyethylene or to fabric coated with chlorosulfonated polyethylene. By adjusting the clearances of the knife or spreader bar and by changing the solids content of the top coating composition, the thickness of the final top coating after drying can be controlled. A solids content of about 25–35% is satisfactory when the coating composition is spread on the chlorosulfonated polyethylene in this fashion. The coating composition can also be sprayed if it is first diluted with toluene to about 15% solids content. Spraying can be used to coat film or coated fabrics but may also be used to top coat irregular shaped surfaces or articles made of chlorosulfonated polyethylene. After the top coating composition has been applied, it may be dried at room temperature or in an air oven at temperatures up to about 100° C. The quantity of the composition applied should be sufficient to form a film about ⅓–2 mils in thickness after drying.

The following example is illustrative of the invention. Parts and percentages are by weight unless otherwise indicated.

*Example*

A top coating composition is prepared by adding (a) 208 parts of a 40% solution in toluene of an acrylic resin made by copolymerization of a 4:1 mixture of methyl methacrylate and ethyl acrylate, (b) 41.25 parts of chlorinated polyethylene containing 53% chlorine, (c) 61.85 parts of xylene, (d) 1.24 parts of a stabilizing composition made from 3 parts barium p-octylphenolate, 1 part cadmium 2-ethylhexoate and 1 part trioctylphosphite, (e) 0.21 part of 2-hydroxy-4-n-octoxybenzophenone, and (f) 46.75 parts of toluene in a suitable container which is closed and rolled at room temperature until solution of all ingredients is complete. The solids content of the resulting mixture is about 35% and the solution is stable over extended periods of time.

This top coating composition is applied to a chlorosulfonated polyethylene coated fabric prepared as described below. The following formulation of (a) 100 parts of chlorosulfonated polyethylene containing about 25% chlorine and 1% sulfur, produced by chlorosulfonation of high density polyethylene, (b) 15 parts of dibasic lead phthalate, (c) 50 parts of titanium dioxide, (d) 2 parts of a non-staining alkylated phenol antioxidant, and (e) 1.5 parts of polyethylene ether glycol of 4000 molecular weight is mixed on a conventional rubber mill. A layer of this formulation of 10–15 mil thickness is then skim coated on unprimed No. 10 cotton duck using a three roll calender with a top roll temperature of 138° C., a middle roll temperature of 127° C. and a bottom roll temperature of 100° C.

The top coating composition is then applied employing a knife over roll spreader or a bird spreader bar and the material is hung in a circulating air oven for 1 minute at 88° C. After drying in the oven, the top coated chlorosulfonated polyethylene coated fabric is found to have a glossy surface. The top coating has not changed the degree of whiteness of the substrate. Manual flexing and creasing does not crack or loosen the top coating from the substrate. Dielectric sealing tests show that the top coated material is equivalent to uncoated material under the same sealing conditions. The resistance to soiling and the ease of cleaning of the top coated material is very good.

Samples are exposed to the weather for 2 months. At the end of this exposure, the specimens show only limited soiling and can be restored to their original state of cleanliness by washing with soap and water. Discoloration due to exposure to sunlight is not detectable with this length of exposure. On bending and flexing the samples by hand, the top coating is found to adhere firmly to the substrate and is sufficiently flexible that no cracking takes place.

The new coating finds use wherever it is desirable to increase the soiling resistance of chlorosulfonated polyethylene. It is particularly useful in protecting chlorosulfonated polyethylene coated fabrics which may be subject to severe soiling during fabrication into such complex articles as automotive convertible tops.

As many apparently widely different embodiments of this invention may be made without departing from the spirit and scope thereof, it is to be understood that this invention is not limited to the specific embodiments thereof except as defined in the appended claims.

What is claimed is:

1. A composition suitable for coating a chlorosulfonated polyethylene containing substrate, said composition consisting essentially of in weight relationship from 175 to 225 parts of a 40 percent solution in toluene of an acrylic resin produced by copolymerizing a 4:1 mixture of methyl methacrylate and ethyl acrylate, from 30 to 50 parts of chlorinated polyethylene containing from 48 to 55 percent chlorine, from 45 to 75 parts of xylene, and a minor proportion of stabilizing agents.

2. A composition suitable for coating a chlorosulfonated polyethylene containing substrate, said composition consisting essentially of in weight relationship from 175 to 225 parts of a 40 percent solution in toluene of an acrylic resin produced by copolymerizing a 4:1 mixture of methyl methacrylate and ethyl acrylate, from 30 to 50 parts of chlorinated polyethylene containing from 48 to 55 percent chlorine, from 45 to 75 parts of xylene, a minor proportion of stabilizing agents, and additional toluene to adjust the solids content of the above.

3. A composition suitable for coating a chlorosulfonated polyethylene containing substrate, said composition consisting essentially of in weight relationship from 175 to 225 parts of a 40 percent solution in toluene of an acrylic resin produced by copolymerizing a 4:1 mixture of methyl methacrylate and ethyl acrylate, from 30 to 50 parts of chlorinated polyethylene containing from 48 to 55 percent chlorine, from 45 to 75 parts of xylene, from 1 to 1.5 parts of a stabilizer composition consisting of barium and cadmium salts of an organic fatty acid and an alkylated phenol along with an organic phosphite, from 0.1 to 0.3 part of a hydroxybenzophenone ultraviolet screening agent, and additional toluene to adjust the solids content of the above.

4. A composition suitable for coating a chlorosulfonated polyethylene containing substrate, said composition consisting essentially of in weight relationship from 175 to 225 parts of a 40 percent solution in toluene of an acrylic resin produced by copolymerizing a 4:1 mixture of methyl methacrylate and ethyl acrylate, from 30 to 50 parts of chlorinated polyethylene containing from 48 to 55 percent chlorine, from 45 to 75 parts of xylene, from 1 to 1.5 parts of a stabilizer composition consisting of 3 parts of barium p-octylphenolate, 1 part cadmium 2-ethylhexoate, and 1 part trioctylphosphite, from 0.1 to 0.3 part of 2-hydroxy-4-n-octoxybenzophenone, and additional toluene to adjust the solids content of the above.

5. The composition of claim 1, wherein said substrate is a fabric coated with chlorosulfonated polyethylene composition.

6. The composition of claim 1, wherein said chlorinated polyethylene is prepared by chlorination of low density, branched polyethylene.

7. The composition of claim 6, wherein said low density, branched polyethylene has a melt index of about 100.

8. A composition suitable for coating a chlorosulfonated polyethylene containing substrate, said composition consisting essentially of in weight relationship from 175 to 225 parts of a 40 percent solution in toluene of an acrylic resin produced by copolymerizing a 4:1 mixture of methyl methacrylate and ethyl acrylate, from 30 to 50 parts of chlorinated polyethylene containing from 48 to 55 percent chlorine, additional solvent for said chlorinated polyethylene to adjust the solids content of the above, and a minor proportion of stabilizer ingredients.

9. The composition of claim 8, wherein said additional solvent is toluene.

10. The composition of claim 8, wherein said additional solvent is methyl ethyl ketone.

11. The composition of claim 8, wherein said additional solvent is xylene.

12. The composition of claim 8, wherein the amount of said additional solvent is sufficient to reduce the solids content below about 35% by weight.

References Cited by the Examiner
UNITED STATES PATENTS

| | | | |
|---|---|---|---|
| 2,970,129 | 1/61 | Rugg et al. | 260—33.6 |
| 3,054,761 | 9/62 | Moore et al. | 260—33.6 |
| 3,084,065 | 4/63 | Bach | 260—33.4 |

MORRIS LIEBMAN, *Primary Examiner.*